United States Patent
Leonardi et al.

(10) Patent No.: US 8,672,001 B2
(45) Date of Patent: Mar. 18, 2014

(54) TOOTH ASSEMBLY AND CUTTING BITS FOR STUMP GRINDER

(75) Inventors: Joseph A. Leonardi, Auburn, NY (US); Bruce C. Jordan, Auburn, NY (US)

(73) Assignee: Leonardi Manufacturing Co. Inc., Weedsport, NY (US)

( * ) Notice: Subject to any disclaimer, the term of this patent is extended or adjusted under 35 U.S.C. 154(b) by 3 days.

(21) Appl. No.: 12/544,146

(22) Filed: Aug. 19, 2009

(65) Prior Publication Data

US 2010/0043922 A1  Feb. 25, 2010

Related U.S. Application Data

(60) Provisional application No. 61/090,078, filed on Aug. 19, 2008, provisional application No. 61/156,654, filed on Mar. 2, 2009.

(51) Int. Cl.
    *B27C 1/00* (2006.01)
(52) U.S. Cl.
    USPC ........ 144/176; 144/24.12; 144/230; 144/235; 144/241
(58) Field of Classification Search
    USPC .............. 144/176, 218, 230, 235, 241, 24.12; 407/30, 33, 40, 43, 46, 47, 56, 66, 67, 407/101, 102, 113; 241/91
    See application file for complete search history.

(56) References Cited

U.S. PATENT DOCUMENTS

| | | | | |
|---|---|---|---|---|
| 2,731,991 | A | * | 1/1956 | Cowley ........................ 144/229 |
| 4,667,713 | A | * | 5/1987 | Wright .......................... 144/231 |
| 4,889,025 | A | * | 12/1989 | Collett .............................. 83/835 |
| 5,058,477 | A | * | 10/1991 | MacLennan ..................... 83/839 |
| 5,085,112 | A | * | 2/1992 | MacLennan ..................... 83/840 |
| 5,088,371 | A | * | 2/1992 | MacLennan ..................... 83/840 |
| 5,103,882 | A | * | 4/1992 | Milbourn ....................... 144/230 |
| 5,131,305 | A | * | 7/1992 | MacLennan ..................... 83/840 |
| 5,146,963 | A | * | 9/1992 | Carpenter et al. ............. 144/231 |
| 5,348,065 | A | * | 9/1994 | Meyer ............................ 144/231 |
| 5,423,361 | A | * | 6/1995 | Richards ........................ 144/341 |
| 5,555,652 | A | | 9/1996 | Ashby |
| 5,743,314 | A | | 4/1998 | Puch |
| 5,996,657 | A | | 12/1999 | Riesselman |
| 6,138,725 | A | | 10/2000 | Leonardi et al. |
| 6,176,445 | B1 | | 1/2001 | Shinn |
| 6,877,535 | B1 | * | 4/2005 | Bennington ................... 144/235 |
| 7,484,541 | B2 | | 2/2009 | Green |
| 7,743,803 | B2 | * | 6/2010 | Paumier ...................... 144/24.12 |
| 2007/0042323 | A1 | | 2/2007 | Florman |
| 2008/0149224 | A1 | | 6/2008 | Kappel et al. |

FOREIGN PATENT DOCUMENTS

JP  06-125920  5/1994

* cited by examiner

*Primary Examiner* — Bena Miller
(74) *Attorney, Agent, or Firm* — George R. McGuire; Bond Schoeneck & King, PLLC

(57) ABSTRACT

A stump grinding wheel tooth assembly having a mounting block positioned around the periphery of the wheel and a cutting bit attached to the mounting block by a pin passing through a hole in the cutting bit and a corresponding hole in the mounting block and capped by a nut. The mounting block may support multiple cutting bits arranged into a predetermined patterns based on the location of the holes, such as pairs of cutting bits or even a quad formation. The cutting bits may be provided in various geometric configurations, such as round, triangular, square, rectangular, pentagonal, hexagonal, octagonal or decagonal.

9 Claims, 6 Drawing Sheets

TOOTH ASSEMBLY AND CUTTING BITS FOR STUMP GRINDER

RELATED APPLICATION

The present application claims priority to U.S. provisional patent application No. 61/090,078, filed on Aug. 19, 2008, and U.S. patent application No. 61/156,654, filed on Mar. 2, 2009; all of the foregoing patent-related document(s) are hereby incorporated by reference herein in their respective entirety(ies).

BACKGROUND OF THE INVENTION

1. Field of the Invention

The present invention relates to grinding tools (see DEFINITIONS section), more particularly to outdoor grinding tools (see DEFINITIONS section), and also more particularly to rotating disc assemblies (including a disc and bit sub-assembly(ies)) for grinding tools.

2. Description of the Related Art

Various types of stump grinders exist in the prior art. These machines typically include: a chassis; a motor; a stump grinding wheel; and teeth. The stump grinding wheel is mechanically connected to the chassis and motor so that the motor rotates the wheel about its central axis. The stump grinding teeth are mounted to the wheel at angular intervals about the central axis. The teeth are mounted either to: (i) the side surfaces of the wheel; or (ii) the peripheral edge of the wheel. A mounting mechanism is used to rigidly mechanically constrain each tooth to the wheel.

In some prior art stump grinder designs, a pocket clamps a tooth having a cutting bit to the wheel and a pair of bolts fixes the pocket to the wheel. In prior art stump grinder designs where the tooth is mounted around the peripheral edge of the wheel, an O-ring or similar type of fastening mechanism is used to fix the tooth to the mounting block which in turn may be brazed or otherwise affixed to the wheel. Regardless of the type of mounting mechanism used, it takes a bit of time and tools to detach a worn or broken tooth from a mounting mechanism, and replace it with a new tooth.

The cutting bit portions of the teeth are worn (or "degrade") by coming into contact with the wood of the stump being ground. Also, the cutting bit portions may come into contact with foreign objects embedded in the wood, such as rock, nails, or other hard substances. The impact with these harder objects greatly increases the degradation of the cutting bits. Once the edge is worn beyond an acceptable limit, the tooth or teeth must be changed.

Traditionally, changing the teeth required the operator to use a drill or other tool to remove bolts that fasten a pocket to the wheel. The teeth, in turn, are clamped to the wheel by the pockets. This process is laborious and, with conventional teeth, the entire tooth has to be discarded and replaced with a new tooth. Thus, in addition, to the downtime associated with changing the teeth, the teeth themselves raise the expense associated with the grinding operation.

U.S. Pat. No. 5,555,652 ("Ashby") discloses a land clearing apparatus that includes a rotating rasp used to shred trees, brush and debris. More specifically, rasp 20 includes drum 22, guard 26, removable impact structures 34 and adaptors 48. As shown in FIG. 2 of Ashby, the removable impact structures and respectively associated are located at regular angular intervals around the rotating drum.

U.S. Pat. No. 5,996,657 ("Riesselman") discloses a stump cutter including a rotatable disk having multiple cutting tool holders. The cutting tool holders each have a cutting tool bit cantilevered therefrom to engage a stump brought into contact with the cutting tool. The cutting tool holder/bit sub-assemblies alternate in the angular direction with sub-assemblies that Riesselman refers to as non-cutting protectors. As shown in FIG. 1 of Riesselman, each bit extend in the radial direction beyond the outermost radial edge of the protectors by a distance of L1. With respect to its protectors and bits Riesselman discloses the following: "In the embodiment shown, the protector 20 is spaced sufficiently far out so that cutting tool bites into an object only to the depth L1 of the hardened cutting tip 16. With traditional stump cutters, no leading protector is provided and the cutter wheel could inadvertently overbite and cause wheel hang-up. I have found that with use of a protector with a massive non-cutting leading edge which is placed ahead of the lead cutting tool a distance denoted by P1, the problem of broken cutting tools is substantially eliminated. That is, the non-cutting leading edge of the protector can be spaced rotationally ahead of the cutting tool to provide protection to the cutting tool. I have found that even with P1 distances of six or seven inches I can still provide protection for the first stage cutter and holder located behind the protector . . . . By having a massive protector that has a greater mass than the cutting tool and is not cantilevered outward as the cutting tool is, the protector can absorb shocks and impacts through gradual abrasion of the protector while the first stage cutting teeth of a row of cutting teeth can be protected." Riesselman does not seem to disclose how large its dimension L1 is supposed to be.

U.S. Pat. No. 6,138,725 ("Leonardi 1") discloses various operating angles and/or angles between components associated with a stump grinding tool rotating disc.

U.S. Pat. No. 6,176,445 ("Shinn") discloses a cutter tooth located on the outer peripheral surface of a rotatable cutter adapted for clearing, mulching and grinding trees.

Other published documents which may be of interest include: (i) U.S. Pat. No. 5,743,314 ("Puch"); (ii) U.S. Pat. No. 7,484,541 ("Green"); and (iii) US patent application 2008/0149224 ("Kappel").

Description Of the Related Art Section Disclaimer: To the extent that specific publications are discussed above in this Description of the Related Art Section, these discussions should not be taken as an admission that the discussed publications (for example, published patents) are prior art for patent law purposes. For example, some or all of the discussed publications may not be sufficiently early in time, may not reflect subject matter developed early enough in time and/or may not be sufficiently enabling so as to amount to prior art for patent law purposes. To the extent that specific publications are discussed above in this Description of the Related Art Section, they are all hereby incorporated by reference into this document in their respective entirety(ies).

BRIEF SUMMARY OF THE INVENTION

Some embodiments of the present invention (see DEFINITIONS section) are directed to a tooth assembly for a stump grinding wheel including a mounting block having a shoulder formed therein, and a cutting bit that may be engaged with shoulder and removably attachable to the mounting block. In a preferred embodiment, the cutting bit is mounted to the mounting block using a bolt that passes through a hole formed through the cutting bit and a corresponding hole formed in mounting block. The bolt is affixed in position through cutting bit and block by a nut. The tooth assembly may optionally include a shock absorber positioned between the cutting bit and the mounting block.

Some embodiments of the present invention are directed to a stump grinding wheel provided with a series of slits formed entirely through one side of wheel to the opposing side. The mounting block may support multiple cutting bits, such as a two, three, or even four cutting bits. Each bit is attached to the mounting block via a pin and hole. The front face of the cutting bits may be configured into a variety of geometric shapes, such as round, triangular, square, rectangular, pentagonal, hexagonal, octagonal or decagonal, and may have rounded edges. Some preferred cutting bits according to the present invention are generally triangular (for example, triangular with rounded corners) and "indexable." More specifically, in some embodiments of the present invention a triangular bit will wear most quickly in the vicinity of a corner of the triangle positioned to extend from the disc in the disc's radial or longitudinal direction. By detaching the cutting bit and repositioning it in an orientation displaced 120 degrees, about the central axis of the bit, from its previous position, a different corner is "indexed" to extend from the disc. This indexing extends the life of the bit.

One aspect of the present invention is a rotating disc assembly where the bit extends past the disc by a relatively small amount in the radial and/or axial directions. Preferably, these extensions are less than 3/16 inch. Even more preferably, they are about 1/8 inch.

Another aspect of the present invention is a disc that includes a radial direction ramp edge extending along the angular direction of the disc from each bit sub-assembly (see FIG. 1 at ramping portion 33 including first flat portion 37, curved portion 35, second flat portion 32 and ramp-meets-receiving-recess portion 34).

Various embodiments of the present invention may exhibit one or more of the following objects, features and/or advantages:

(i) reduction of mechanical shocks due to square impacts between bits and hard debris in the soil (for example rocks);

(ii) reduction of equipment breakage due to square impacts between bits and hard debris in the soil (for example rocks);

(iii) reduction of flying debris occasioned by stump grinding due to square impacts between bits and hard debris in the soil (for example rocks);

(iv) use of rock stop prevents and/or reduces damage caused by physical interference with hard debris;

(v) use of rock stop prevents and/or reduces groove from being worn into the disc in the vicinity of the leading edge of a well and associated bit assembly;

(vi) use of rock stop made of a soft/hard material matrix collects dirt in operation and provides a helpful dirt/dirt interface between the disc and the dirt within which it is rotating and grinding;

(vii) it is a principal object and advantage of the present invention to provide a tooth assembly that allows the cutting bits to be easily replaced;

(viii) it is another object and advantage of the present invention to provide a tooth assembly that supports multiple cutting bits;

(ix) it is a further object and advantage of the present invention to provide cutting bits having various applications; and (x) other objects and advantages of the present invention may, in part, be readily apparent to those of ordinary skill in the relevant art and, in part, may be explicitly stated hereinafter.

According to an aspect of the present invention, a disc assembly for a grinder includes a disc, a first bit holder, a first bit and a first connection hardware set. The disc defines a central axis, a radial direction and an angular direction. The disc includes a peripheral edge and has at least one receiving recess defined in its peripheral edge. The first bit holder is mechanically connected to the disc and at least partially received in the at least one receiving recess. The first bit holder defines a first bit holder hole. The first bit defines a first bit hole. The first connection hardware set is structured and located to mechanically connect the first bit to the first bit holder. The first connection hardware set includes an elongated member located to extend at least partially through the first bit holder hole and the first bit hole.

According to another aspect of the present invention, a disc assembly for a grinder includes a disc, a first bit holder, a first bit and a first connection hardware set. The disc defines a central axis, a radial direction and an angular direction. The first bit holder is mechanically connected to the disc. The first bit holder includes a front surface generally facing a direction of rotation of the disc. The first bit includes a front surface generally facing a direction of rotation of the disc. The first connection hardware set is structured and located to mechanically connect the first bit to the first bit holder so that the front surface of the first bit holder is at least substantially aligned with the front surface of the first bit holder.

According to another aspect of the present invention, a disc assembly for a grinder includes a disc, a first bit holder, a first bit and a first connection hardware set. The disc defines a central axis, a radial direction and an angular direction. The first bit holder is mechanically connected to the disc. The first connection hardware set is structured and located to mechanically connect the first bit to the first bit holder. The disc includes a peripheral edge that defines at least one receiving recess. The first bit holder is at least partially received in the receiving recess. The first bit holder is substantially L-shaped in a plane perpendicular to the central axis of the disc, with one arm of the "L" being a received portion of the first bit holder and the other arm of the "L" being a bit securing portion of the first bit holder. The received portion of the first bit holder is at least partially received in the receiving recess. The received portion of the first bit holder includes a bit facing surface that faces the direction of extension of the bit securing portion. The first connection hardware set is structured and located to mechanically connect the first bit to the bit securing portion of the first bit holder in a position so that the bit facing surface of the received portion of the first bit holder at least substantially faces the first bit.

According to another aspect of the present invention, a disc assembly for a grinder includes a disc, a first bit assembly and a second bit assembly. The disc defines a central axis, a radial direction and an angular direction. The disc includes a peripheral edge and has a first receiving recess and a second receiving recess defined therein. A first ramping portion of the peripheral edge extends along the angular direction from the first receiving recess to the second receiving recess. The first bit assembly is mechanically connected to the disc and at least partially received in the first receiving recess. The second bit assembly is mechanically connected to the disc and at least partially received in the second receiving recess. The first ramping portion increases in it radial size as it extends from the first receiving recess to the second receiving recess.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
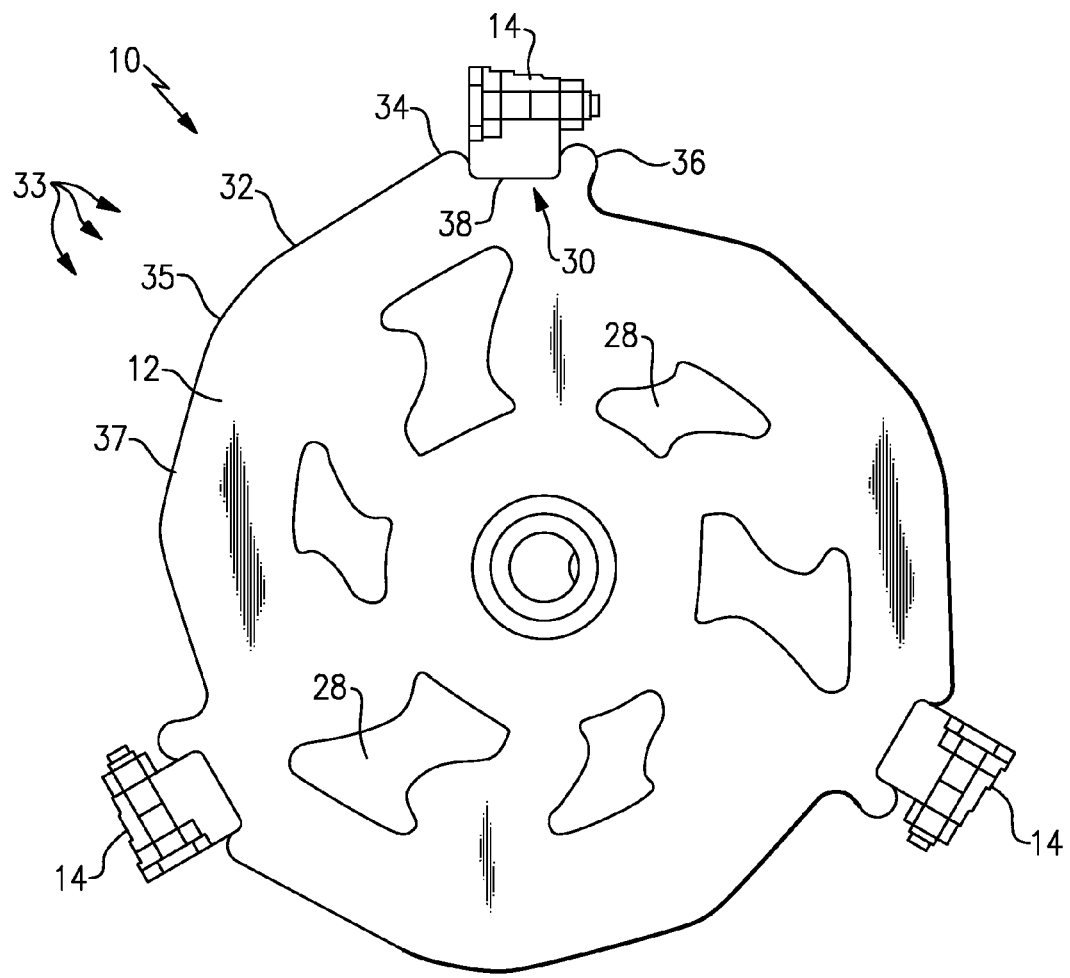
FIG. 1 is a schematic of an embodiment of a stump grinding wheel according to the present invention.

Referring now to the drawings, wherein like reference numerals refer to like parts throughout, there is seen in FIG. 1 a stump grinding wheel 10 according to the present invention. Wheel 10 includes a series of tooth assemblies 12 mounted thereon. As seen in FIG. 1, tooth assemblies 12 are spaced annularly around the periphery of wheel 10, but those of skill in the art will recognize that tooth assemblies 12 may be positioned on either side of wheel 10. For example, Applicant's co-pending applications, Ser. Nos. 11/926,886 and 11/927,040, hereby incorporated by reference, discloses various tooth assembly configurations.

Figure 2A:
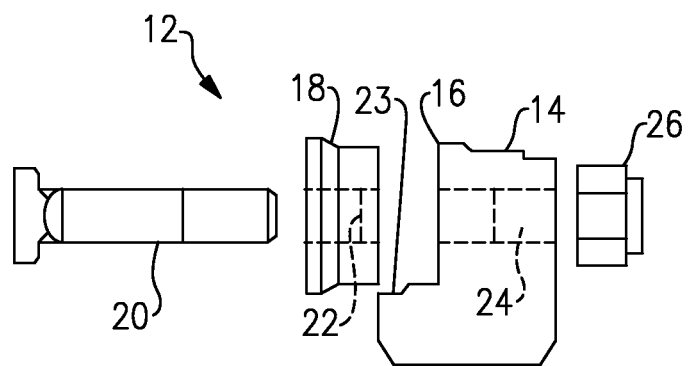
FIGS. 2A-2C are schematics of a tooth assembly according to the present invention.
Figure 2B:
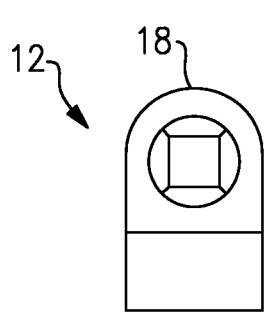
Figure 2C:
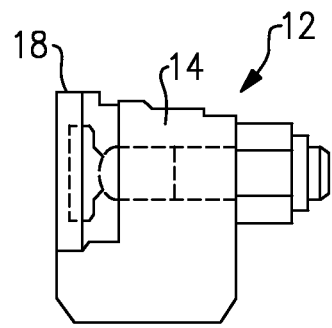

Referring to FIGS. 2A-2C, tooth assembly 12 comprises a mounting Block 14, a shoulder 16 and a cutting bit 18 that may be engaged with shoulder (or bit base) 16 and removably attachable to shoulder piece 16 and block (or bit holder) 14. In a preferred embodiment, cutting bit 18 is mounted to block 14 using an elongated member in the form of bolt 20 that passes through a hole 22 formed through cutting bit 18 and a corresponding hole 24 formed in block 14. Bolt 20 is affixed in position through cutting bit 18 and block 14 by a nut 26. Bolt 20 may be countersunk or comprise a half-round head so that it could be angled relative to cutting bit 18 to provide the additional clearance needed on large diameter wheels 10. As seen in FIGS, 3A, 3B, 3C (upper bit), 3D, 4 (last bit in the series shown) and 5, cutting bit 18 may be made generally triangular in shape (that is, the peripheral edge of the cutting bit has three flat portions 18a, 18b, 18c (see FIG. 5)) and positioned such that one base of the triangular shape is positioned proximately to wheel 10 and an apex of the triangle extending outwardly. In some embodiments, a flat portion opposite the apex will sit on a blade facing surface 23 of block (or bit holder) 14. Because the bit has multiple flat surfaces, it can be rotated about its central axis and "indexed" between multiple position and the active portion(s) of the bit wears. For example, with a triangular bit, when one apex wears, then the other apexes can be rotated into the high wear position to extend the life of the bit.

In another embodiment of the present invention, stump grinding wheel 10 may be provided with a series of slits 28 formed entirely through one side of wheel 10 to the opposing side, as seen in FIG. 1. Wheel 10 further includes a series of receptacles 30 formed in its peripheral edge 32, where each receptacle 30 includes a forward lip 34 and a rearward lip 36 that define a receiving location 38 therebetween for affixing mounting block 14. As described earlier, mounting blocks 14 are preferably positioned around the periphery of wheel 10 in spaced annular relation to each other.

Figure 3A:
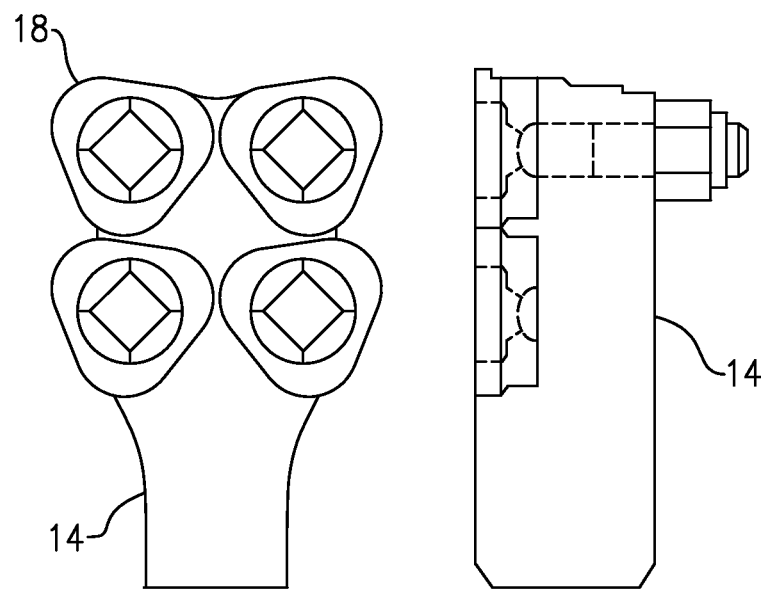
FIGS. 3A-3D are schematics of various embodiments of tooth assembly according to the present invention.
Figure 3B:
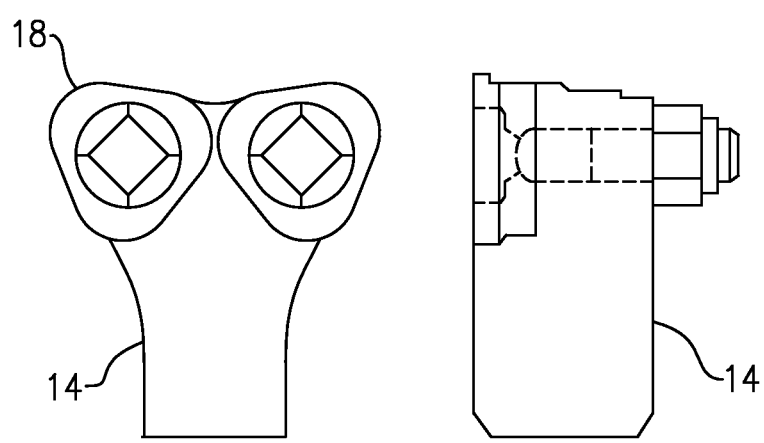
Figure 3C:
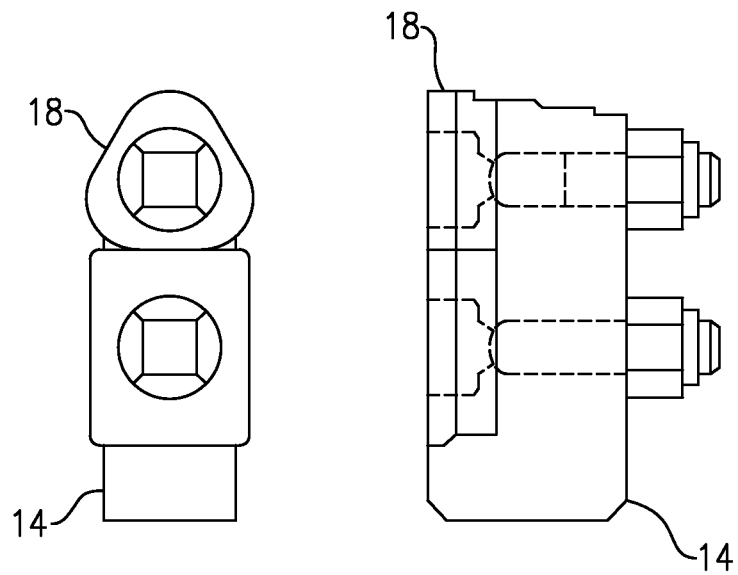
Figure 3D:
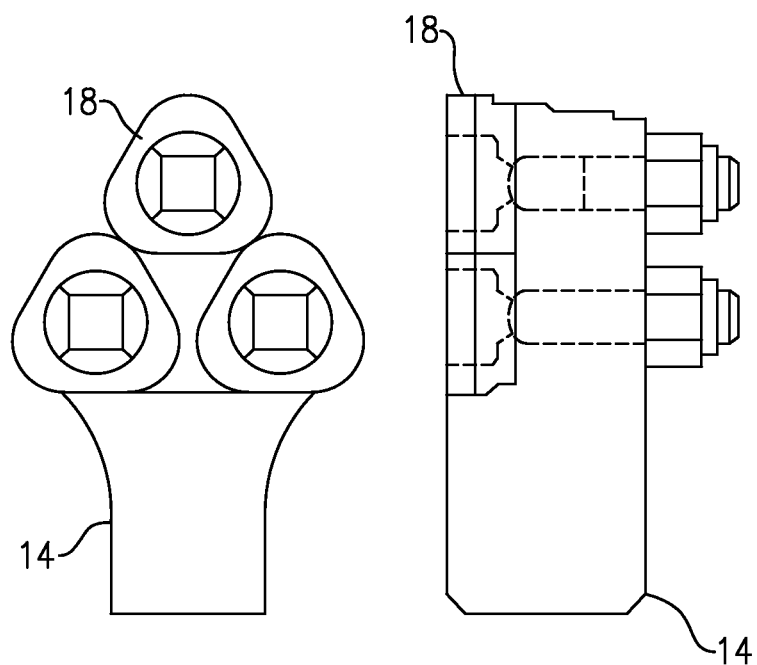

Referring to FIGS. 3A-3D, tooth assembly 12 accordingly to the present invention may comprise a variety of configuration for supporting multiple cutting bits 18. For example, as seen in FIG. 3A, tooth assembly 12 includes a mounting block 14 that is configured to support four cutting bits 18, wherein each bit 18 is attached to mounting block 14 via a pin and hole, as described earlier with respect to FIG. 1. Alternatively, mounting block 14 may support a pair of cutting bits 18 positioned side-by-side relative to wheel 10, as seen in FIG. 3B, or a pair of stacked cutting bits 18, as seen in FIG. 3C. As seen in FIG. 3D, mounting block (or bit holder) 14 may optionally support three cutting bits 18 positioned into a triangular configuration.

Figure 4:
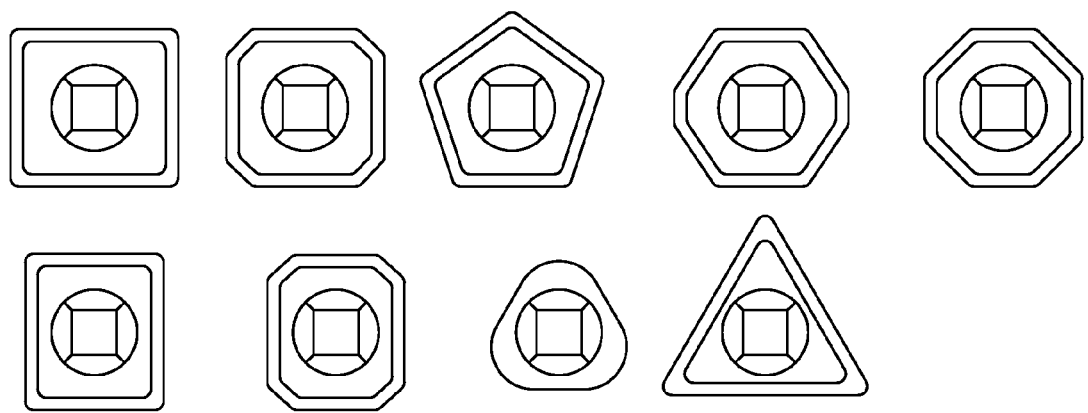
FIG. 4 is a perspective view of an alternative tooth assembly according to the present invention.
Figure 5:
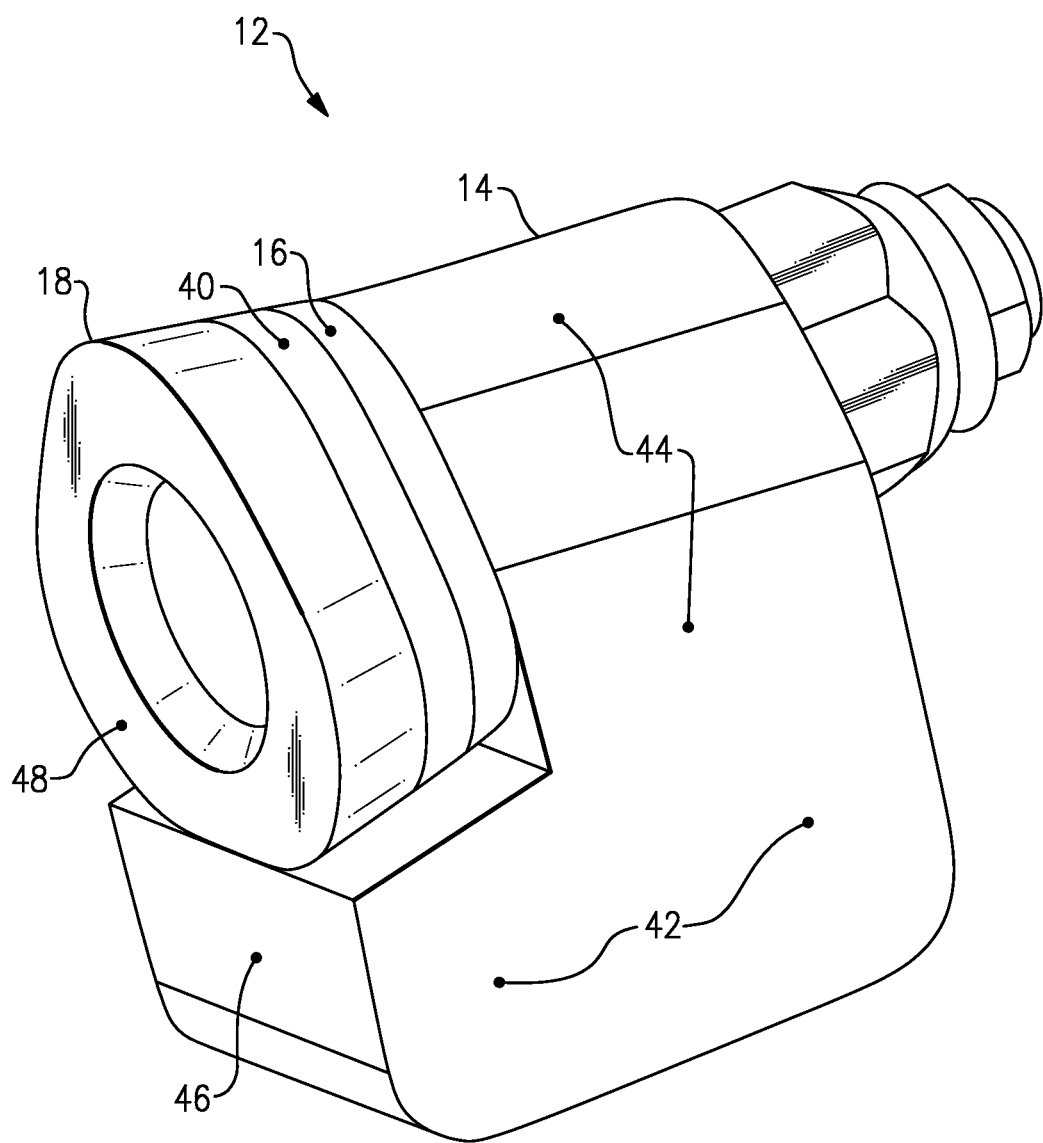
FIG. 5 is a schematic of an alternative embodiment of a tooth assembly according to the present invention.

As seen in FIG. 4, the front face of cutting bits 18 may be configured into a variety of geometric shapes, such as round, triangular, square, rectangular, pentagonal, hexagonal, octagonal or decagonal, and may have rounded edges. Referring to FIG. 5, tooth assembly 12 may further comprise a shock absorber 40 positioned between cutting bit 18 and shoulder 16 of mounting block 14.

As shown in FIG. 5, bit holder 14 is generally "L" shaped, with one arm of the "L" being a receiving portion 42, and the other arm of the "L" being a bit securing portion 44. The bit holder includes a front surface 46. The bit also includes a front surface 48. As shown in FIGS. 1, 2C, 3A, 3B, 3C, 3D and 5, in some preferred embodiments of the invention, the front surface of the bit is at least approximately flush with the front surface of the bit holder.

Definitions

Any and all published documents mentioned herein shall be considered to be incorporated by reference, in their respective entireties, herein to the fullest extent of the patent law. The following definitions are provided for claim construction purposes:

Present invention: means at least some embodiments of the present invention; references to various feature(s) of the "present invention" throughout this document do not mean that all claimed embodiments or methods include the referenced feature(s).

First, second, third, etc. ("ordinals"): Unless otherwise noted, ordinals only serve to distinguish or identify (e.g., various members of a group); the mere use of ordinals implies neither a consecutive numerical limit nor a serial limitation.

Mechanically connected: Includes both direct mechanical connections, and indirect mechanical connections made through intermediate components; includes rigid mechanical connections as well as mechanical connection that allows for relative motion between the mechanically connected components; includes, but is not limited, to welded connections, solder connections, connections by fasteners (for example, nails, bolts, screws, nuts, hook-and-loop fasteners, knots, rivets, force fit connections, friction fit connections, connections secured by engagement added by gravitational forces, quick-release connections, pivoting or rotatable connections, slidable mechanical connections, latches and/or magnetic connections).

Grinding tools: any tool for grinding any type of matter; grinding tools include, but are not necessarily limited to: mowers, mulchers; horizontal grinders; tub grinders and/or stump grinders; electric motor powered grinding tools, internal combustion powered grinding tools; man-portable grinding tools; stationary grinding tools; and/or vehicle portable grinding tools.

Outdoor grinding tools: any grinding tool designed primary for use in an outdoor environment typically including one or more of the following materials: stumps, live plants, brush, soil, clay, sand, small rocks, large rocks, medium rocks, man-made debris (for example, sidewalk, discarded trash); outdoor grinding tools include, but are not necessarily limited to: mowers, mulchers; outdoor horizontal grinders; outdoor tub grinders and/or stump grinders.

Disc: any member that defines a central axis and two major surfaces and is shaped to be suitable for being driven into rotation about its central axis, without regard to: (i) whether its shape is particularly circular; (ii) flatness in the axial direction; (iii) whether it is formed as a single piece; and/or (iv) presence or absence of holes or apertures through the disc; it is highly preferable for discs to be rotationally balanced with respect to both angular distribution of mass and axial distribution of mass, but this is not necessarily required; in some embodiments of the present invention, the "disc" may take the form of a drum, having multiple bit sub-assemblies along its relatively long axial dimension.

Bit: any member suitable for being driven into rotation to grind soil, debris and/or plant matter: (i) material used to make the bit; (ii) number of pieces making up the bit; (iii) number of cutting edges on the bit; (iv) whether the bit is more suitable for grinding stumps, brush or live trees; and/or (v) specific shape of the bit holder.

received in a recess: if a part is received in a recess, it does not necessarily mean that the received part actually touches the recess; there may intermediate layers or parts between the received part and the receiving surface of the recess.

between: a first part shall be considered to be in "between" a second part and a third part even if there are intermediate parts between the second part and first part and/or between the first part and third part; for example, in the character string "ABCDE," C is considered to be "between" A and E (and also between B and E, and also between A and D, and also between B and D).

surface: not limited to planar surfaces, not limited to surfaces without discontinuities.

To the extent that the definitions provided above are consistent with ordinary, plain, and accustomed meanings (as generally shown by documents such as dictionaries and/or technical lexicons), the above definitions shall be considered supplemental in nature. To the extent that the definitions provided above are inconsistent with ordinary, plain, and accustomed meanings (as generally shown by documents such as dictionaries and/or technical lexicons), the above definitions shall control.

Unless otherwise explicitly provided in the claim language, steps in method steps or process claims need only be performed in the same time order as the order the steps are recited in the claim only to the extent that impossibility or extreme feasibility problems dictate that the recited step order be used. This broad interpretation with respect to step order is to be used regardless of whether the alternative time ordering(s) of the claimed steps is particularly mentioned or discussed in this document in other words, any step order discussed in the above specification shall be considered as required by a method claim only if the step order is explicitly set forth in the words of the method claim itself. Also, if some time ordering is explicitly set forth in a method claim, the time ordering claim language shall not be taken as an implicit limitation on whether claimed steps are immediately consecutive in time, or as an implicit limitation against intervening steps.

What is claimed is:

1. A stump grinder machine comprising:
    a stump grinder frame;
    a disc defining a central axis, a radial direction and an angular direction, the disc including a peripheral edge and having defined therein a first receiving recess located at the peripheral edge of the disc;
    a first bit holder mechanically connected to the disc at the peripheral edge of the disc, the first bit holder defining a first bit holder hole, wherein the first bit holder is L-shaped and has a first arm and a second arm connected to form a generally right angle, the first arm having defined therein the first bit holder hole of the bit holder and the second arm sized, shaped and/or structured to be received in the first receiving recess;
    a first bit defining a first bit hole;
    wherein the second arm comprises a bit receiving surface structured, sized, shaped and/or located to abut the first bit when the first bit is mechanically connected to the bit holder;
    a first connection hardware set;
    wherein:
    the first connection hardware set includes an elongated member;
    the first connection hardware set is structured and located to detachably mechanically connect the first bit to the first bit holder;
    the first connection hardware set includes an elongated member located to extend: (i) through the first bit holder hole of the first bit and, (ii) into the first bit holder hole of the first bit holder;
    the disc is rotationally mechanically connected to the stump grinder frame so that the disc can rotate about the central axis; and
    the stump grinder frame, the disc, the first bit holder and the bit are structured, located, sized, shaped and/or connected so that the stump grinder can be used to grind a stump that is in the ground.

2. The machine of claim 1 wherein:
    the elongated member of the first connection hardware set is a bolt and includes a bolt head portion and a threaded portion;
    the first connection hardware set further includes a nut; and
    threaded engagement between the bolt and nut of the first connection hardware set secure the first bit with respect to the first bit holder.

3. The machine of claim 1 further comprising a first shock absorber, wherein:
    the first shock absorber defines a first shock absorber hole;
    the first shock absorber is located at least substantially between the first bit and the first bit holder;
    the elongated member of the first connection hardware set passes through the first shock absorber hole; and
    the first connection hardware set is further structured and located to mechanically connect the first shock absorber to the first bit holder and the first bit; and
    the first shock absorber has a substantially similar profile as the bit taken in a plane perpendicular to a direction of elongation of the elongated member of the first connection hardware set.

4. A disc assembly for a grinder, the disc assembly comprising:
    a disc defining a central axis, a radial direction and an angular direction and at least one receiving recess;
    a first bit holder mechanically connected to the disc, the first bit holder being at least partially received in the receiving recess and including a front surface generally facing a direction of rotation of the disc, and wherein the first bit holder is substantially L-shaped in a plane perpendicular to the central axis of the disc, with one arm of the "L" being a received portion of the first bit holder and the other arm of the "L" being a bit securing portion of the first bit holder;
    a first bit including a front surface generally facing a direction of rotation of the disc;
    a first connection hardware set structured and located to detachably mechanically connect the first bit to the first bit holder so that the front surface of the first bit holder is at least substantially aligned with the front surface of the first bit;

wherein the received portion of the first bit holder is at least partially received in the receiving recess;

wherein the received portion of the first bit holder includes a bit supporting surface that faces the radial direction;

wherein a first connection hardware set is structured and located to mechanically connect the first bit to the bit securing portion of the first bit holder in a position so that the bit supporting surface of the received portion of the first bit holder abuts the first bit when the first bit is mechanically connected to the first bit holder; and wherein the first bit holder, the disc and the first bit are sized, shaped, structured, located and/or connected so that the disc assembly can be used as a tool for grinding matter.

5. The assembly of claim 4 wherein the first bit holder, the disc and the first bit are sized, shaped, structured, located and/or connected so that the disc assembly can be used as a tool for grinding stumps in the ground .

6. A disc assembly for a grinder, the disc assembly comprising:

a disc defining a central axis, a radial direction and an angular direction, the disc including a peripheral edge and having a first receiving recess and a second receiving recess defined therein, with a first ramping portion of the peripheral edge extending along the angular direction from a position outside the first receiving recess to a position outside the second receiving recess, wherein said position outside the first receiving recess begins at a first point where the distance from the central axis to the perimeter becomes static, and wherein said position outside the second receiving recess begins at a second point where the distance from the central axis to the perimeter becomes static;

a first bit assembly mechanically connected to the disc and at least partially received in the first receiving recess; and a second bit assembly mechanically connected to the disc and at least partially received in the second receiving recess;

wherein at least a portion of the first ramping portion increases in radial size as it extends from the first receiving recess to the second receiving recess.

7. The assembly of claim 6 wherein the first ramping portion comprises:

a first flat portion;

a second flat portion; and a curved portion extending between the first flat portion and the second flat portion.

8. The assembly of claim 6 wherein the first bit assembly comprises a first bit, a first bit holder and a first bit base, with the first bit base being located between the first bit holder and the first bit.

9. The assembly of claim 6 wherein
the first bit assembly comprises a first bit, a first bit base and a first shock absorber, with the first shock absorber being located between the first bit holder and the first bit.

* * * * *